June 16, 1959

C. E. TACK 2,890,767

ROTOR BRAKE

Filed April 25, 1955

INVENTOR.
Carl E. Tack
BY
Walter L. Schlegel, Jr. Atty.

Witness:
Richard W Carpenter

June 16, 1959  C. E. TACK  2,890,767
ROTOR BRAKE
Filed April 25, 1955  3 Sheets-Sheet 2
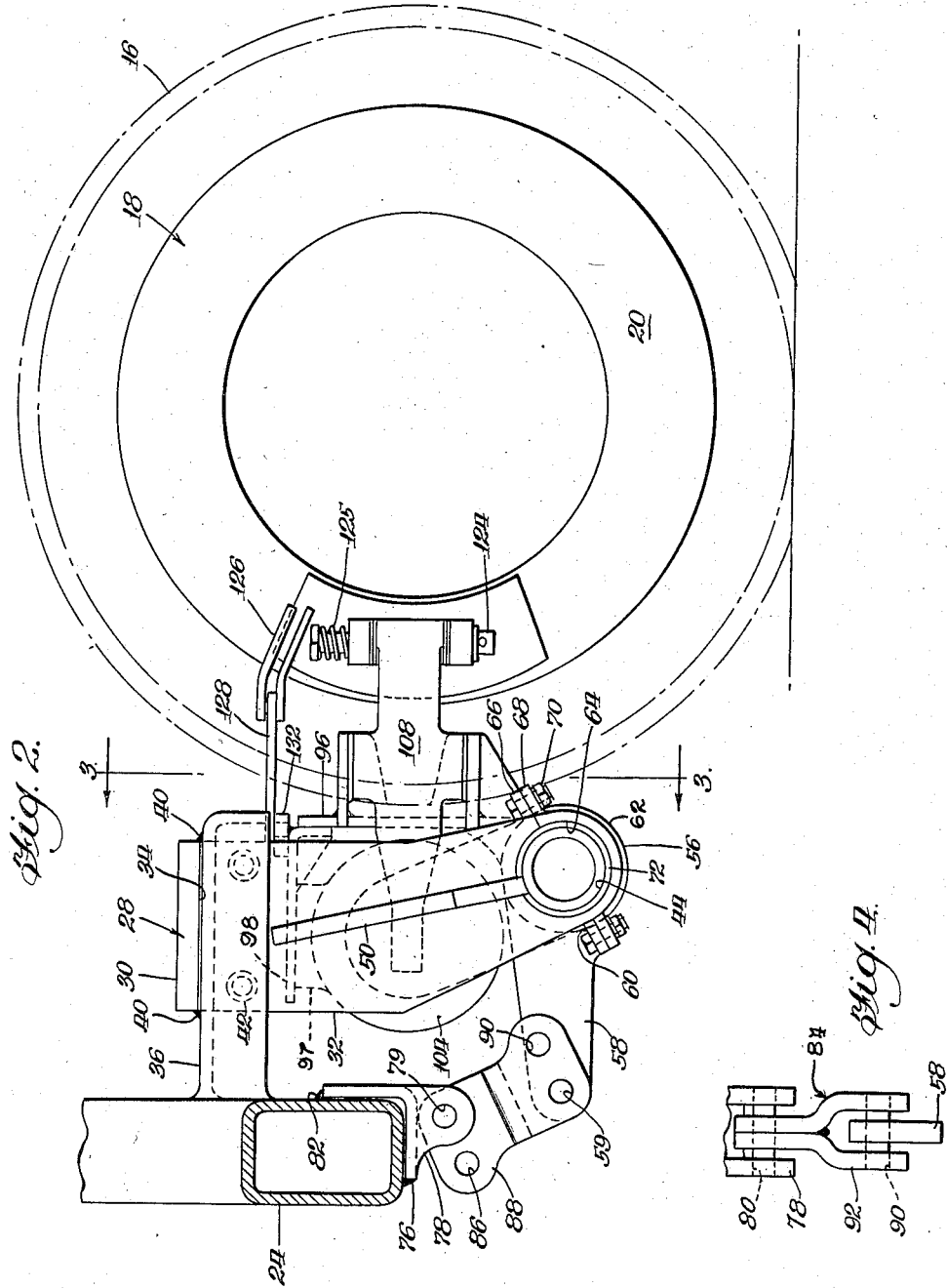
INVENTOR.
Carl E. Tack
BY
Walter L. Schlegel, Jr.
Atty.

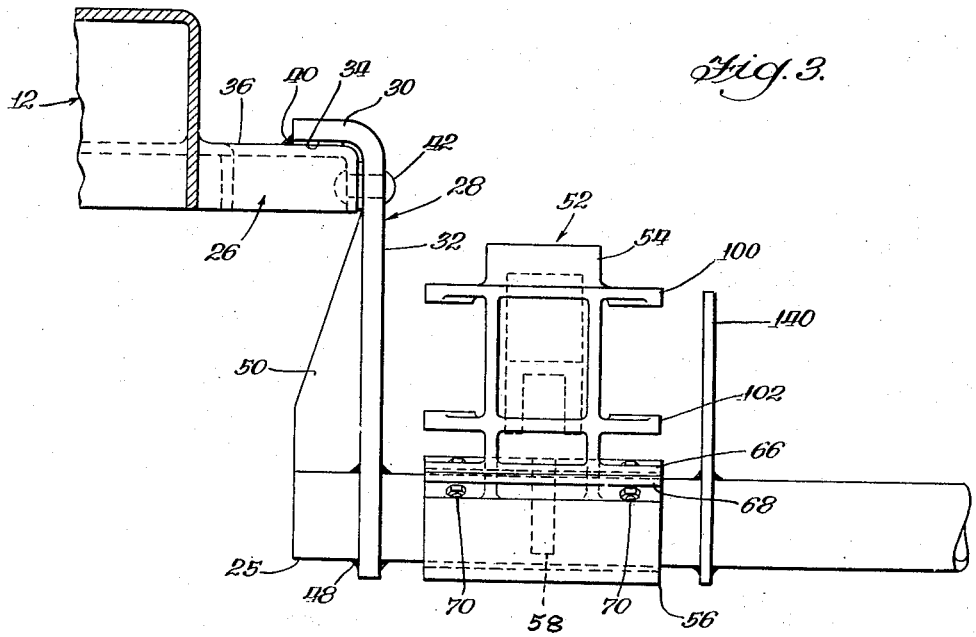
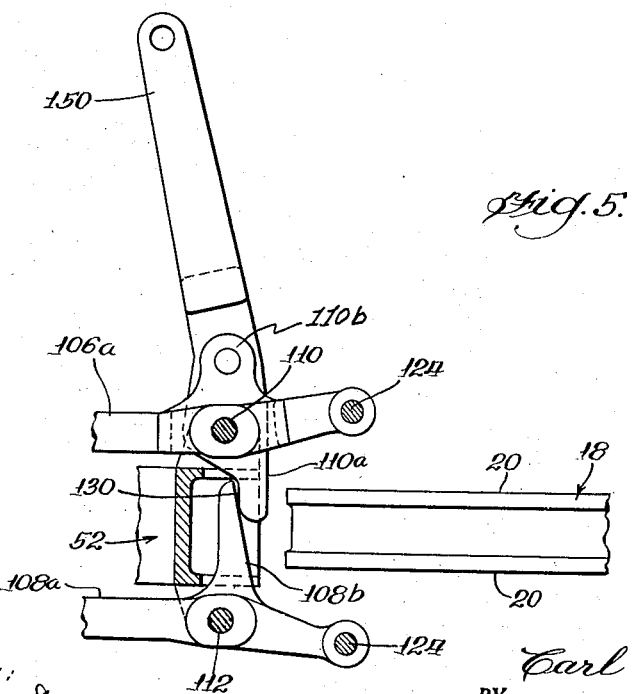

United States Patent Office 2,890,767
Patented June 16, 1959

2,890,767
ROTOR BRAKE

Carl E. Tack, Chicago, Ill., assignor to American Steel Foundries, Chicago, Ill., a corporation of New Jersey Application April 25, 1955, Serial No. 503,717

12 Claims. (Cl. 188—59)

This invention relates to brake arrangements and more particularly to those employed in vehicles such as railway car trucks.

The invention comprehends a novel arrangement for mounting a brake mechanism on a transverse bar rigidly suspended from the truck frame.

It is well understood by those familiar with the art of railway brakes, and brake principles in general, that one of the basic problems in the design of brake mechanisms is to overcome stresses on the brake parts, especially the pivotal connections, caused by the braking torque. Although it is impossible to eliminate braking torque, it can be transmitted to that part of the structure most able to withstand it, in this case the truck frame.

In this novel arrangement, the braking torque is transmitted directly to the transom of the truck frame, without submitting the brake support bar to the torque, thereby eliminating torque stresses on the bar.

It is therefore a primary object of this invention to relieve the braking mechanism of braking torque stresses by transmitting the torque directly to the truck frame.

Another object of the invention is to provide a mounting arrangement wherein the braking torque can be transmitted to the frame without passing through the brake supporting member.

Another object of the invention is the provision of a torque transmitting linkage that will readily permit the adjustable positioning of the brake mechanism on its support.

A more specific object of the invention is to provide an arrangement whereby a transverse bar supporting the brake mechanism is journaled in the brake frame to permit the limited pivotal movement of the brake frame.

These and other objects of the invention will be apparent from an examination of the specification and drawings, wherein:

Figure 2 is a side elevational view of the structure illustrated in Figure 1;

Figure 3 is a partial sectional view taken along the line 3—3 of Figure 2;

Figure 4 is a detail view of the adjustable torque connecting link;

Figure 5 is a fragmentary plan view of a hand brake arrangement.

Figure 1:
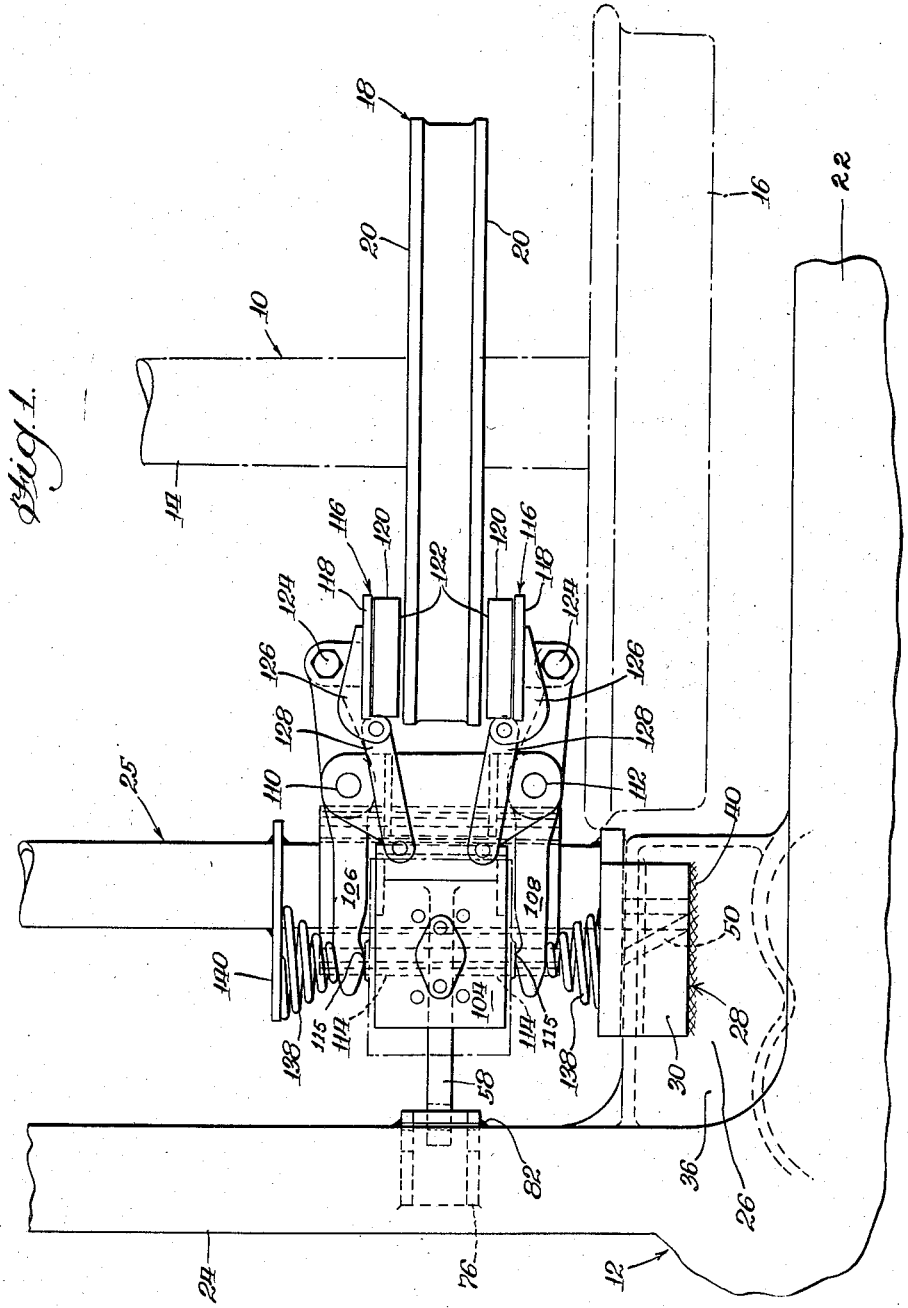
Figure 1 is a fragmentary plan view of one quadrant of a railway car truck embodying the invention, the other three quadrants preferably being symmetrical.

It will be understood that certain elements have been omitted from certain views, where they are illustrated to better advantage in other views.

Describing the invention in detail, referring first to Figure 1, it will be seen that the railway car truck is of a conventional type comprising a wheel and axle assembly 10 and a frame 12 supported thereby in a conventional manner (not shown).

The wheel and axle assembly comprises an axle 14 having wheels 16 (only one of which is shown). A rotor 18 having friction surfaces 20 on opposite sides thereof may be rigidly secured to the wheel and/or axle to be rotatable therewith.

The truck frame includes side rails 22 extending longitudinally of the truck and interconnected by transverse members, or transoms, 24 extending transversely of the truck and preferably formed integrally with the side rails.

A generally horizontal brake support bar 25, suspended from the side members of the truck, supports the brake mechanism. To suspend the brake bar, a horizontal shelf or platform 26 may be secured to or formed integrally with each side rail, preferably near its merger with the transom.

An L-shaped brake bar support bracket 28, comprising horizontal and vertical plates 30 and 32, respectively, may be positioned on the inboard side of each platform 26, with the lower surface 34 of plate 30 seated on the upper surface 36 of platform 26 and the plate 32 depending therefrom. The bracket 28 may be rigidly secured to the platform 26 in any desired manner, as by welds 40 and/or rivets or bolts 42. It is to be understood that a similar arrangement (not shown) on the opposite end of the truck will support the other end of brake bar 25. The respective ends of bar 25 are received in apertures 44 of plates 32 and may be rigidly secured thereto as by welds 48 to prevent rotation of the bar. To provide additional rigidity for the structure a transverse web 50 may be formed integrally with or fixedly secured to the plate 32 and the bar 25.

A brake frame designated generally at 52 may be cradled on the bar 25 adjacent the rotor 18. The brake frame 52 comprises an upper bracket 54, a lower cradle or saddle portion 56, and a torque arm 58 formed integrally with and projecting laterally from the saddle portion 56. The saddle portion 56 may be divided into upper and lower portions 60 and 62, respectively, which define an aperture 64 therebetween, and which are interconnected by pins 70 extending through aligned apertures of lugs 66 and 68, respectively. The brake frame 52 is saddled, or cradled, on bar 25 with the bar being received through, or journaled in the aperture 64 to permit limited pivotal movement of the brake frame about the longitudinal axis of the bar. A layer of wear lining material 72 may be interposed between the bar and brake frame.

The torque arm 58 may be connected to the truck frame transom bracket 76 through the transom 24 by means of a link or clevis 84. The bracket 76, preferably comprises a pair of horizontally spaced depending lugs 78, presenting coaxially aligned apertures 80, and may be fixed to the transom adjacent the brake frame in any desired manner such as by welds 82.

The link 84 preferably comprises an upper arm 88 having a plurality of spaced apertures 86 and a pair of spaced lower arms 92 each having spaced aligned apertures 90. The apertures 86 and 90 offer selective adjustable means of connection between the transom bracket 76 as at pin hole 79 and the torque arm as at pin hole 59, respectively.

The brake frame bracket 54 includes a vertical plate 96 having a horizontal plate 98 extending rearwardly therefrom in the direction of the transom and having upper and lower spaced horizontal plates 100 and 102, respectively, extending forwardly therefrom in the direction of the wheel and axle assembly. A conventional power cylinder 104 may be suspended from plate 98 between the vertical plate 96 and the transom by means of mounting bracket 97.

Brake levers 106 and 108 may be fulcrumed to the brake frame 54 by means of pins 110 and 112, respectively, which extend through horizontal plates 100 and 102 and permit the pivotal movement of the brake levers in a horizontal plane.

The cylinder 104 may be provided with pistons 114 which abuttably engage and actuate the rearward portions 115 of the respective brake levers.

Brake head assemblies 116, comprising brake heads 118 and brake shoes 120 having friction surfaces 122, are pivotally connected as at 124 to the forward ends of the respective brake levers for engagement with friction surfaces 20 of the rotor 18. A spring 125 may be provided on the pin 124 to maintain a firm nonrattling pivotal connection between the brake lever and the bolster end.

It will be understood that the invention may also be applicable to an arrangement employing a single rotor, although the embodiment illustrated comprehends an arrangement having two rotors on the axle.

In order to maintain parallel engagement between the surfaces 122 of the shoes and surfaces 20 of the rotor, a novel linkage arrangement is provided between the brake frame and the respective brake head assemblies. Guide arms or lugs 126, formed integrally with or fixedly secured to the respective brake heads, are connected to the outer ends of links 128 which have their respective inner ends pivotally connected to brake frame blocks or plates 132 on the horizontal plate 98 of the brake frame.

Release of the brake levers may be achieved by means of a pair of release springs 138. One spring is preferably positioned between one of the brake levers and an adjacent vertical plate 140, rigidly affixed to bar 25 and extending upwardly therefrom adjacent the related brake lever; the other spring may be positioned between the other brake lever and vertical plate 32.

To describe the operation, referring again to Figure 1, it will be seen that as the pistons 114 of the cylinder 104 are actuated they engage the inner ends 115 of the respective brake levers and push them away from the cylinder causing the levers to rotate about their respective pivots 110 and 112, and carry their respective brake shoes into engagement with the surfaces of the rotor.

The springs 138 have, in addition to their function as release springs, two other equally important functions. They serve to position the brake frame on the brake support bar in lateral relationship with the rotor.

Upon application of the brake levers, any subsequent lateral movement of the wheel and axle assembly will cause the brake frame to move against the spring force, so that upon release of the brake levers the brake frame will again be positioned properly.

Additionally, the springs permit lateral movement of the brake frame with the wheel and axle assembly when the brake levers are in released position, so the rotor is not forced against one of the brake shoes.

It will be noted that link 84, as seen in Figure 4, has a gap between its jaws 92 and the embraced torque arm 58 to accommodate this lateral motion without causing undue stress on the link. Also it will be seen that the link or clevis 84, by providing selective adjustable means of connecting the end of the torque arm to the transom, makes it possible to adjust the position of the brake frame on the support bar 25 to any desired position.

Figure 5 illustrates an arrangement for the manual actuation of the brake levers. The levers 106a and 108a are similar to the levers 106 and 108, respectively, except that lever 108a is provided with a lug or arm 108b extending inwardly toward the other brake lever. An actuating lever 150 is pivotally connected to the brake lever 106a at pivot 110 and rigidly connected thereto by pin 110b, and is provided with an arm or lug 110a, which extends toward and is engageable with arm 108b of the other brake lever.

Upon actuation of the lever 150 by conventional means (not shown) arm 110a engages arm 108b causing lever 108a to pivot counterclockwise bringing its shoe into engagement with the rotor. At this point, the lever 150 pivots at point 130, the point of connection between arms 110a and 108b, and urges the brake lever 106a to rotate clockwise about pivot 110 and carry its shoe into engagement with the rotor.

I claim:

1. In a rotor brake arrangement for a railway car truck having a truck frame and a supporting wheel and axle assembly with a rotatable member presenting a pair of axially spaced friction surfaces, the combination of: a transversely extending brake supporting bar rigidly supported at its ends from the truck frame; a brake frame mounted on said bar adjacent said member and capable of limited pivotal and axial movement on said bar; friction means engageable with said surfaces; power means supported by said brake frame; brake levers fulcrumed to the brake frame and operatively interconnecting the power means and the friction means; and means interconnecting the brake frame and the truck frame and operable to transmit braking torque directly from the former to the latter, said torque transmitting means accommodating limited axial movement of the brake frame on said supporting bar.

2. A rotor brake suspension arrangement according to claim 1, wherein said truck frame includes a transom extending transversely of the truck in a direction parallel to said brake bar, and wherein said torque transmitting means comprises a link interconnecting torque lugs presented by the brake frame and transom, respectively.

3. A rotor brake suspension arrangement according to claim 2, wherein said link is provided with a plurality of apertures spaced from each other to afford an adjustable connection between the link and the brake frame and transom lugs.

4. A rotor brake suspension arrangement according to claim 1, and including brake lever release spring means carried by the support bar entirely independently of the brake frame.

5. A rotor brake suspension arrangement according to claim 4, wherein the brake release spring means is operable to release the brake levers, to position the brake frame on the support bar in alignment with the member longitudinally of the truck when the brake levers are in applied position, and to permit limited axial movement of the brake frame on the support bar when the brake levers are in release position.

6. A rotor brake suspension arrangement according to claim 4, wherein said brake lever release spring means comprises a pair of plates presenting opposed vertical surfaces facing the power means and disposed adjacent the respective brake levers on the sides of the levers remote from said power means, and a pair of compression springs disposed between respective brake levers and their related surfaces.

7. In a rotor brake suspension arrangement for a railway car truck having a truck frame and a supporting wheel and axle assembly including a rotatable member with a pair of axially spaced friction surfaces, the combination of: a transversely extending brake support bar carried by the frame; a brake frame mounted on the bar adjacent said member and free for limited movement pivotally and axially on said bar; friction means engageable with said surfaces; power means carried by said brake frame; a pair of brake levers fulcrumed to said frame and operatively interconnecting the power means and the respective friction means; and brake lever release spring means carried by the bar entirely independently of the brake frame.

8. A rotor brake suspension arrangement according to claim 7, wherein the brake release spring means is operable to release the brake levers, to position the brake frame on the support bar in alignment with the member longitudinally of the truck when the brake levers are in applied position, and to permit limited axial movement of the brake frame on the support bar when the brake levers are in release position.

9. A rotor brake suspension arrangement according to claim 7, wherein said brake lever release spring means comprises a pair of plates presenting opposed vertical surfaces facing the power means and disposed adjacent the respective brake levers on the sides of the levers remote from said power means, and a pair of compression springs disposed between respective brake levers and their related surfaces.

10. In a rotor brake suspension arrangement for a railway car truck having a truck frame including a transversely extending transom element and a supporting wheel and axle assembly including a pair of axially spaced rotatable members each presenting a pair of opposed friction surfaces, a transversely extending brake support bar suspended adjacent its ends from said truck frame between the transom element and the wheel and axle assembly; a pair of axially spaced independent brake mechanisms mounted on the bar adjacent the respective members for engagement therewith, said mechanisms being capable of limited pivotal and axial movement on said bar; and independent torque transmitting means interconnecting each of the respective brake mechanisms with the transom element of the frame.

11. In a rotor brake suspension arrangement for a railway car truck having a truck frame including a pair of longitudinally extending side elements interconnected by a transversely extending transom element, and a wheel and axle assembly with a pair of rotatable friction surfaces, the combination of: a pair of generally vertically extending plates depending from and having their upper ends rigidly secured to the truck frame at opposite sides of the truck; a transversely extending brake supporting bar disposed between the transom element and the wheel and axle assembly and having its opposite ends rigidly secured to the lower ends of the respective plates; a brake mechanism mounted on said bar intermediate said plates for limited pivotal and axial movement on said bar; and means interconnecting the brake mechanism and the transom and operable to transmit braking torque directly from the former to the latter.

12. A rotor brake suspension arrangement according to claim 11, wherein the upper ends of the respective plates are rigidly secured to shelves formed integrally with the transom element and the respective side members adjacent opposite ends of the transom element.

References Cited in the file of this patent
UNITED STATES PATENTS

| | | |
|---|---|---|
| 1,944,509 | Hankins | Jan. 23, 1934 |
| 2,355,121 | Tack et al. | Aug. 8, 1944 |
| 2,377,190 | Tack | May 29, 1945 |
| 2,416,869 | Eksergian | Mar. 4, 1947 |
| 2,481,127 | Ledwinka | Sept. 6, 1949 |
| 2,622,704 | Gaenssle et al. | Dec. 23, 1952 |
| 2,622,705 | Gaenssle | Dec. 23, 1952 |
| 2,627,322 | Tack | Feb. 3, 1953 |
| 2,667,946 | Helsten | Feb. 2, 1954 |
| 2,687,786 | Kelly | Aug. 31, 1954 |
| 2,792,082 | Casey | May 14, 1957 |